United States Patent
Randall et al.

(10) Patent No.: US 10,852,424 B2
(45) Date of Patent: Dec. 1, 2020

(54) SWEEPING RADAR DEVICES AND METHODS OF USE THEREOF

(71) Applicants: Nathan Randall, Greenville, KY (US); Joshua Randall, Central City, KY (US)

(72) Inventors: Nathan Randall, Greenville, KY (US); Joshua Randall, Central City, KY (US)

(73) Assignee: Nathan Randall, Greenville, KY (US)

( * ) Notice: Subject to any disclaimer, the term of this patent is extended or adjusted under 35 U.S.C. 154(b) by 385 days.

(21) Appl. No.: 15/946,203

(22) Filed: Apr. 5, 2018

(65) Prior Publication Data

US 2018/0292528 A1    Oct. 11, 2018

Related U.S. Application Data

(60) Provisional application No. 62/481,920, filed on Apr. 5, 2017.

(51) Int. Cl.

| | |
|---|---|
| *G01S 13/931* | (2020.01) |
| *G08B 5/36* | (2006.01) |
| *G01S 13/92* | (2006.01) |
| *G01S 13/88* | (2006.01) |
| *G01S 17/93* | (2020.01) |
| *G01S 13/42* | (2006.01) |
| G01S 15/931 | (2020.01) |
| G01S 17/931 | (2020.01) |

(52) U.S. Cl.
CPC .......... *G01S 13/931* (2013.01); *G01S 13/426* (2013.01); *G01S 13/886* (2013.01); *G01S 13/92* (2013.01); *G01S 17/93* (2013.01); *G08B 5/36* (2013.01); *G01S 15/931* (2013.01); *G01S 17/931* (2020.01); *G01S 2013/9315* (2020.01); *G01S 2013/93271* (2020.01); *G01S 2013/93272* (2020.01); *G01S 2013/93273* (2020.01); *G01S 2013/93274* (2020.01); *G01S 2013/93275* (2020.01)

(58) Field of Classification Search
CPC ....... G08B 5/36; G01S 13/426; G01S 13/886; G01S 13/92; G01S 13/931; G01S 15/931; G01S 17/93
See application file for complete search history.

(56) References Cited

U.S. PATENT DOCUMENTS

| | | | | |
|---|---|---|---|---|
| 3,967,283 | A * | 6/1976 | Clark | G01S 13/343 342/28 |
| 4,786,164 | A * | 11/1988 | Kawata | G01S 17/931 356/5.05 |
| 2003/0128188 | A1* | 7/2003 | Wilbrink | G06F 3/041 345/158 |
| 2012/0109560 | A1* | 5/2012 | Huang | G01M 5/0091 702/75 |

\* cited by examiner

*Primary Examiner* — Dao L Phan
(74) *Attorney, Agent, or Firm* — Dinsmore & Shohl LLP

(57) ABSTRACT

Sweeping radar devices and methods for detecting objects in the vicinity of a vehicle are provided. The sweeping radar device includes a transmitting device, receiving device, and a processor. The method involves transmitting an electromagnetic wave, receiving the wave, converting the wave to an electromagnetic signal, processing the signal to generate an output criterion, interpreting the output criteria and triggering at least one response by a vehicle, which may be an affirmative response, such as a siren or flashing lights, or may be a passive response.

20 Claims, 4 Drawing Sheets

SWEEPING RADAR DEVICES AND METHODS OF USE THEREOF

CROSS-REFERENCE TO RELATED APPLICATIONS

This application claims the benefit of U.S. Provisional Application Ser. No. 62/481,920, filed Apr. 5, 2017, which is incorporated by reference herein in its entirety.

TECHNICAL FIELD

Embodiments of the present disclosure generally relate to sweeping radar devices and methods of use thereof. Specifically, embodiments of the present disclosure relate to sweeping radar devices and methods for detecting objects in the vicinity of a vehicle to promote safety.

BACKGROUND

Emergency vehicles, such as police cars, ambulances, and fire trucks often pull off to the side of the road when assisting others. An emergency vehicle will typically pull over behind the object at issue, positioned to shield the object (such as a car or person) from the approaching traffic when issuing a citation or assisting a vehicle involved in an accident. This places the emergency vehicle in a precarious position, as they are often forced to work quite close to oncoming traffic. An alarming number of emergency vehicles and emergency workers are involved in collisions each year by unassuming vehicles who fail to recognize the proximity of the emergency vehicle to the roadway until a collision is imminent.

SUMMARY

Accordingly, a need exists for a safety measure to prevent collisions with vehicles that are pulled over on the side of the road.

The embodiments of the present disclosure address these needs by providing radar devices to detect objects in the vicinity of a vehicle and methods for detecting objects in the vicinity of a vehicle to alert the approaching object and the vehicle of a probable collusion to promote and ensure vehicle safety.

In one embodiment, a sweeping radar device is provided that includes a transmitting device, receiving device, and a processor. The transmitting device transmits at least one electromagnetic wave in a sweeping fashion. The receiving device is coupled to the transmitting device and receives the electromagnetic wave and converts it into an electromagnetic signal. The processor is coupled to the receiving device and produces at least one output criterion that triggers a response by a vehicle. The response may be affirmative or passive, where an affirmative response activates one or more components selected from the group consisting of an internal light in the vehicle, an external light on the vehicle, an internal alarm in the vehicle, an external alarm on the vehicle, or combinations of these, and the passive response does not activate a component in the vehicle.

In another embodiment, a method for detecting objects in the vicinity of a vehicle is provided. The method involves transmitting an electromagnetic wave, receiving the wave, converting the wave to an electromagnetic signal, processing the signal to generate an output criterion, interpreting the output criteria and triggering at least one response by a vehicle. The response may be affirmative or passive, where an affirmative response activates one or more components selected from the group consisting of an internal light in the vehicle, an external light on the vehicle, an internal alarm in the vehicle, an external alarm on the vehicle, or combinations of these, and the passive response does not activate a component in the vehicle.

Additional features and advantages of the described embodiments will be set forth in the detailed description which follows, and in part will be readily apparent to those skilled in the art from that description or recognized by practicing the described embodiments, including the detailed description which follows as well as the claims.

BRIEF DESCRIPTION OF THE DRAWINGS

The following detailed description of specific embodiments of the present disclosure can be best understood when read in conjunction with the following drawings, in which.

DETAILED DESCRIPTION

Figure 1:
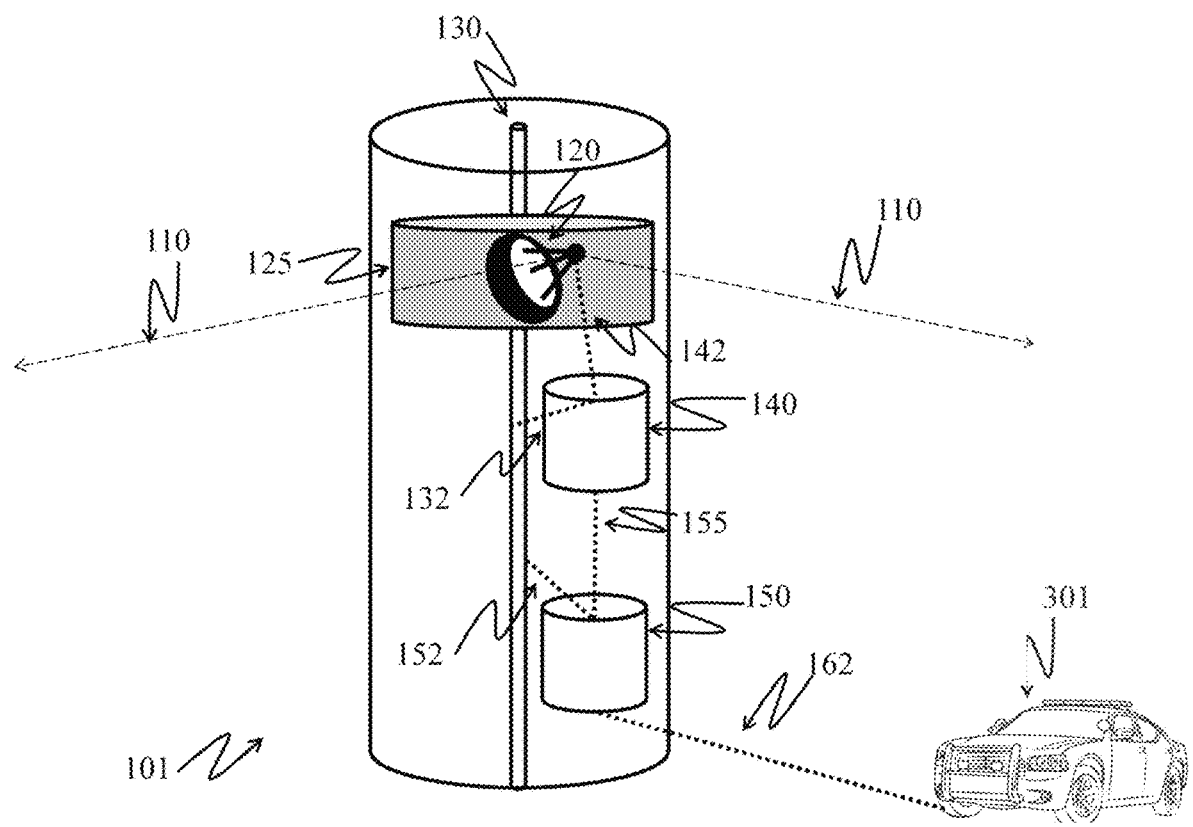
FIG. 1 is a schematic illustration of components of an example sweeping radar device according to embodiments shown and described herein.

The following description of the embodiments is exemplary and illustrative in nature and is in no way intended to be limiting it its application or use. Unless otherwise expressly indicated, the disclosure of any ranges in the specification and claims are to be understood as including the range itself, any values subsumed therein, as well as endpoints.

Embodiments of the present disclosure are generally directed to radar systems and methods for detecting objects in the vicinity of a vehicle. In some embodiments, the radar system of the present disclosure includes a transmitting device that transmits an electromagnetic wave, a receiving device coupled to the transmitting device that receives the electromagnetic wave and converts it into an electromagnetic signal, and a processor coupled to the receiving device that interprets the electromagnetic signal and produces an output criterion that triggers a response by a vehicle, such as an alarm, light, or siren in or on the vehicle or a passive "no result" response. As used herein, "coupled" refers to a communicative connection between two or more components that may be directly or indirectly connected and may or may not be mechanically connected.

Specific embodiments will now be described with references to the figures. Whenever possible, the same reference numerals will be used throughout the drawings to refer to the same or like parts. As used throughout this disclosure, the singular forms "a," "an" and "the" include plural referents unless the context clearly dictates otherwise. Thus, for example, reference to "a" component includes aspects having two or more such components, unless the context clearly indicates otherwise.

FIG. 1 is a schematic cross-sectional illustration of an embodiment of a sweeping radar device 101 according to the present disclosure. The sweeping radar device 101 may utilize radar (radio detection and ranging) technology. The sweeping radar device 101 of the present disclosure may be used for vehicles 301 (shown with reference to FIG. 2A) to detect objects in the vicinity of the vehicle 301 to trigger an alarm in attempts to avoid collision. The sweeping radar device 101 may be coupled to the vehicle 301, and in some embodiments, may be mounted on the vehicle 301 or may be freely movable. The vehicle 301 may, for instance, be an emergency vehicle, a police car, a fire truck, an ambulance, a boat, a personal watercraft, a piece of construction equipment, a piece of farm equipment, or a forklift. The sweeping radar device 101 shown in FIG. 1 is depicted in a cross-sectional view to show one potential arrangement of the inner workings in a schematic representation. It should be understood that this is merely a generalized depiction of one embodiment of a sweeping radar device 101.

As shown in FIG. 1, in some embodiments, the sweeping radar device 101 may include a transmitting device 120 that transmits at least one wave or other frequency, such as an electromagnetic wave 110. The transmitting device 120 may be any device suitable of transmitting electromagnetic waves 110. Non-limiting examples of suitable transmitting devices 120 may include a pulse generating device, a frequency-modulated oscillator, a transmitter antenna, a patch antenna, a transmitter oscillator, a satellite antenna, a linear antenna, or a parabolic antenna. While the transmitting device 120 is depicted as a satellite antenna in FIG. 1, the transmitting device 120 may be a linear or parabolic antenna, or any other suitable device that transmits electromagnetic waves 110.

The electromagnetic waves 110 may include radio waves, infrared (IR) waves, ultraviolet (UV) rays, visible waves, microwaves, gamma rays or x-rays. In some embodiments, the electromagnetic wave 110 may include at least one of radio waves, ultraviolet waves, visible light waves, near infrared light waves, infrared light waves, or combinations of these. The electromagnetic waves 110 may be reflected or scattered and may be transmitted in a sweeping pattern. In some embodiments, the electromagnetic waves 110 may be generated by a signal generator (not shown). The electromagnetic waves 110 may be produced by any suitable device, such as, for example, a magnetron. In some embodiments, the signal generator may be coupled to the transmitting device 120, the receiving device 130, or both.

In some embodiments, the transmitting device 120 may rotate within a housing 125 to transmit the electromagnetic waves 110 in a sweeping pattern. In other embodiments, it may not be necessary for the transmitting device 120 to be mobile to transmit the electromagnetic waves 110 in a sweeping pattern. The transmitting device 120 may transmit electromagnetic waves 110 in a sweeping pattern that may vary anywhere from 1° to 360° in an arc, as measured from the centermost point of the transmitting device 120 of the sweeping radar device 101. For instance, the transmitting device 120 may transmit electromagnetic waves 110 in an arc from 1° to 270°, or from 1° to 210°, or from 1° to 180°, or from 1° to 120°, or from 1° to 90°. In some embodiments, the transmitting device 120 may rotate within the housing 125 to transmit the electromagnetic waves 110 in a 180° arc, or a 270° arc, or a 90° arc. In some embodiments, the sweeping pattern of the electromagnetic waves 110 may be predetermined or may in some embodiments, may be random.

The sweeping radar device 101 may also include a receiving device 130 to receive the at least one electromagnetic wave 110. In FIG. 1, the receiving device 130 is depicted as a linear antenna, however it should be understood that in some embodiments the receiving device 130 may be a satellite antenna, a parabolic antenna, or any other suitable receiving device 130. In some embodiments, the transmitting device 120, the receiving device 130, or both, may be an antenna. The receiving device 130 may be the same device or a different device from the transmitting device 120. In some embodiments, both the transmitting device 120 and the receiving device 130 may be part of one component in the sweeping radar device 101.

In embodiments in which one component of the sweeping radar device 101, such as an antenna, acts as both a transmitting device 120 and a receiving device 130, the sweeping radar device 101 may further include a duplexer 140 coupled to the transmitting device 120 (depicted by dashed line 142) and coupled to the receiving device 130 (depicted by dashed line 132). The duplexer 140 may alternate the functionality of the component, such as an antenna, from a transmitting device 120 to a receiving device 130 and back from a receiving device 130 to a transmitting device 120. Any suitable duplexer 140 may be used. Non-limiting examples of suitable duplexers 140 may include enhanced duplexers having a high dynamic range (HDR) amplifier and a signal cancellation topology, adaptive duplexers, antenna port duplexers, and the like.

The sweeping radar device 101 of the present disclosure may additionally include a processor 150. The electromagnetic signals may be transmitted to a processor 150. The receiving device 130 may interpret the one or more electromagnetic waves 110 and may process the electromagnetic waves 110 to generate electromagnetic signals (not shown). Any suitable processor 150 may be used. The processor 150 may interpret the electromagnetic signal to produce at least one output criterion. The processor 150 may utilize a variety of indicators in formulating the output criteria. For instance, in some embodiments the processor 150 may determine the speed of an object, the distance of the object to the vehicle 301, the trajectory of the object, the size of the object, the location of the object, and other such indicators. This may allow for the sweeping radar device 101 to prevent or reduce the occurrence of false alarm triggers. For instance, the sweeping radar device 101 may be able to determine that based on the speed, distance, trajectory, size, or other indicators, the object detected may or may not be a threat to the vehicle 301.

The processor 150 may receive the at least one output criteria and trigger at least one response by the vehicle 301. The response by the vehicle 301 may be an affirmative response or a passive response. The passive response may be a "no result" response meaning that a component in or on the vehicle 301 is not triggered by a passive response. In contrast, an affirmative response may activate one or more components in the vehicle 301. An affirmative response may activate any component in the vehicle 301, which may vary based on the application of use and the vehicle 301. In some embodiments, an affirmative response may activate, for instance, an internal light in the vehicle 301, an external light on the vehicle 301, an internal alarm in the vehicle 301, an external alarm on the vehicle 301, or other similar lights and/or alarms. The affirmative response may activate one or more components in the vehicle 301. The affirmative response may determine the severity in activating one or more components, such as the brightness of the lights, the duration of the lights, the pattern of lights used, the decibel level of the alarm, the duration of the alarm, the sound pattern of the alarm used, and other similar measures. An affirmative response may also trigger one or more components in the vehicle 301, or a sequence of components in the vehicle 301 as a response. In some embodiments, the processor 150 may interpret the output criteria to determine whether the affirmative response or the passive response should be generated, and, if the affirmative response is determined, the processor 150 may assign a severity level of the affirmative response based on the at least one of the speed of the object or the distance of the object to the vehicle 301, or any of the other indicators, including those previously described. The severity level of the affirmative response may determine at least one of which of the one or more components in the vehicle 301 are activated, an amount of the one or more components in the vehicle 301 that are activated, an intensity of the one or more components that are activated, a duration of the one or more components that are activated, or combinations of any of these.

Figure 2A:
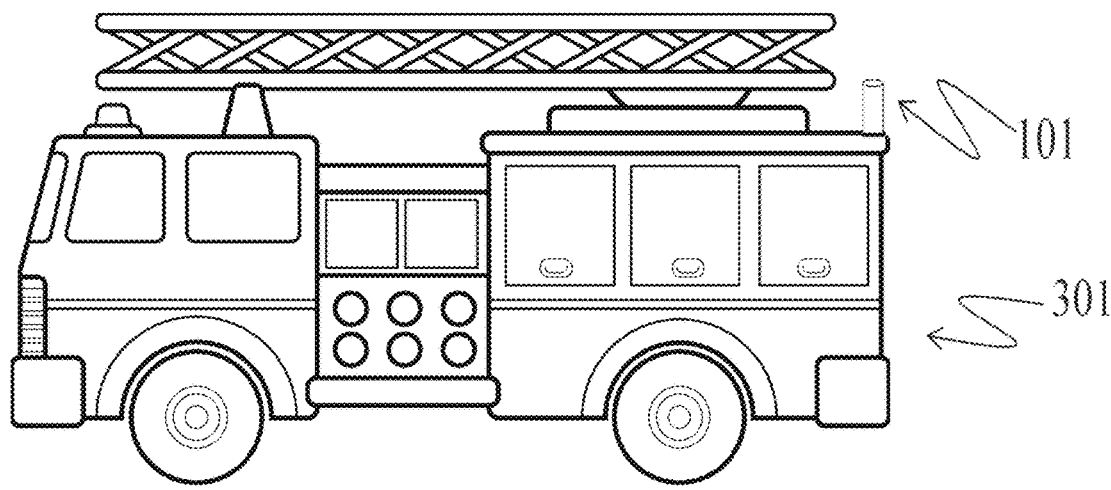
FIG. 2A is a schematic depiction of an example placement of a sweeping radar device on a vehicle, according to embodiments shown and described herein.
Figure 2B:
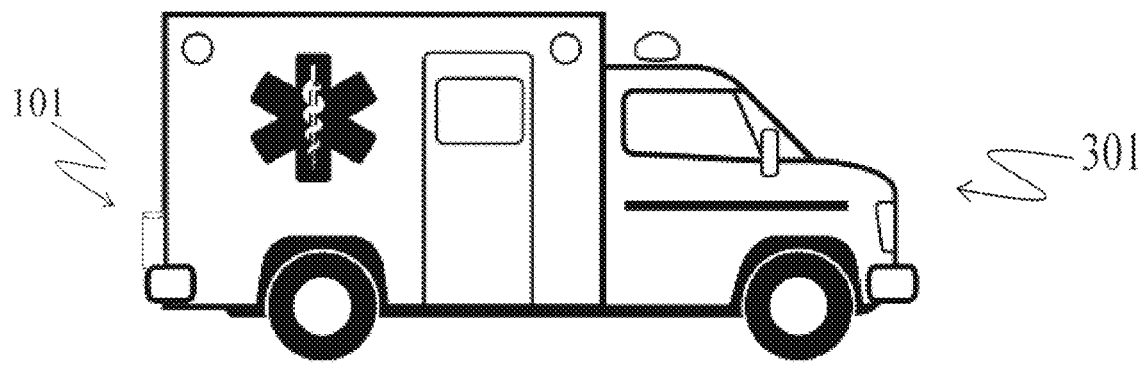
FIG. 2B is a schematic depiction of another example placement of a sweeping radar device on a vehicle, according to embodiments shown and described herein.
Figure 2C:
FIG. 2C is a schematic depiction of another example placement of a sweeping radar device on a vehicle, according to embodiments shown and described herein.

Referring now to FIGS. 2A, 2B, and 2C, three different example embodiments of the placement of the sweeping radar device 101 on a vehicle 301 are shown. In FIG. 2A, the sweeping radar device 101 is positioned on a top surface of the vehicle 301, which is a firetruck. In some embodiments, the sweeping radar device 101 may be mounted onto the vehicle 301, or may be otherwise integrated into the vehicle 301. In FIG. 2B, the sweeping radar device 101 is shown on the back bumper of the vehicle 301, which is an ambulance. Again, the sweeping radar device 101 may be mounted, integrated, or otherwise secured to the vehicle 301 in any suitable fashion based on the desired use and application, vehicle 301 specifications and the like. Finally, in FIG. 2C the sweeping radar device 101 is located on the front bumper of the vehicle 301, which is a police car. The sweeping radar device 101 may be positioned in any location on the vehicle 301 such that the sweeping radar device 101 is able to properly transmit and receive the electromagnetic waves 110. The sweeping radar device 101 may be placed in a variety of locations, as shown, to prevent obstruction and to allow for a better, clearer and more precise reading of electromagnetic waves 110 based on whether the sweeping radar device 101 is detecting objects behind the vehicle 301 (such as the arrangement depicted in 2A), to the front of the vehicle 301 (such as depicted in 2B), or objects that have a long-range distance to the vehicle 301 (such as depicted in 2C).

In other embodiments, the sweeping radar device 101 may be freely movable. In some embodiments, the sweeping radar device 101 may be placed in other locations than the vehicle 301, such as, for instance, on a concrete construction barrier, construction cone, roadway barrier, on construction equipment, on farm equipment, on a flag or staking device, or on any other suitable object. The sweeping radar device 101 may still be able to detect objects within a specified vicinity to alert the user of dangerous conditions and, particularly, of the likelihood of a collision.

Figure 3:
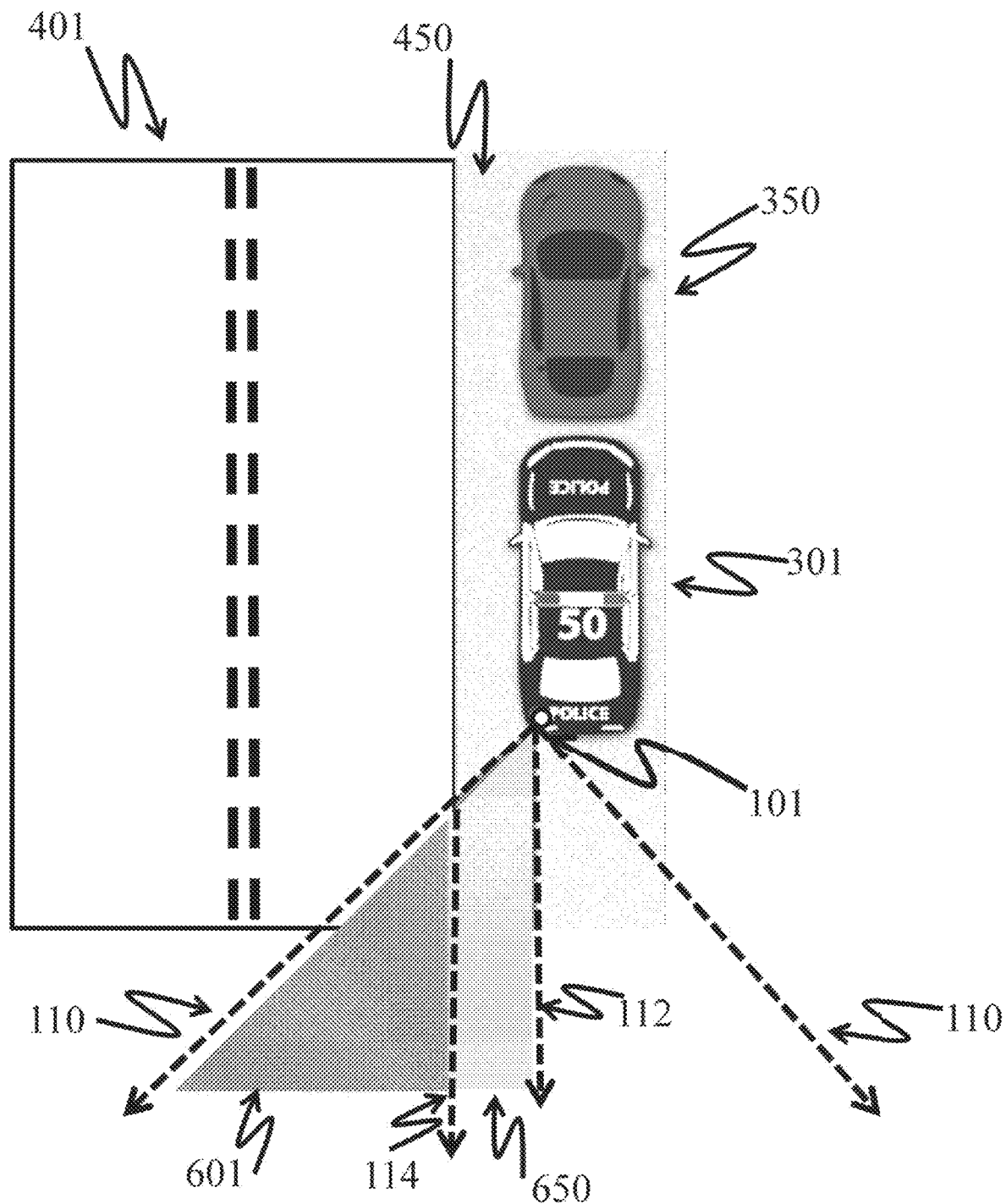
FIG. 3 is a schematic depiction of an example use of an example sweeping radar device according to embodiments shown and described herein.

FIG. 3 schematically depicts one embodiment of the present disclosure in which the vehicle 301 is a police car that has pulled over a car 350, for instance, to issue a citation. The vehicle 301 is pulled over on the shoulder 450 of the road 401. The sweeping radar device 101 is shown positioned on the back rear bumper of the vehicle 301, as depicted in FIG. 2A. In FIG. 3, the electromagnetic waves 110 are being cast outwardly from the vehicle 301 in a sweeping pattern. In some embodiments, the sweeping radar device 101 may determine whether an object is within a dangerous proximity, such as a "danger range" 650 based on the proximity to the vehicle 301. In FIG. 3, the danger range 650 would indicate that a car is traveling on or too close to the shoulder 450 of the road 401. If an object is detected within the danger range 650, the output criteria may signal an affirmative response in the vehicle 301, triggering, for instance, the lights and/or siren of the police car to alert the driver to change its course. The sweeping radar device 101 may also be able to determine whether a car is in a "safe range" 601 which may cause the output criteria to trigger a passive response in the vehicle 301 which does not trigger an alarm or the sirens. In some embodiments, the dimensions 112, 114 of the danger range 650 may be adjusted to additionally indicate a intermediary semi-dangerous range (not pictured) in which a lesser alarm is trigger, for instance, the lights of the vehicle 301, to alert the driver of the presence of the vehicle 301. If the driver corrects his or her course, the affirmative response may cease, whereas if the driver continues or ventures into the danger range 650, the severity level of the affirmative response may be increased, for instance, activating both the lights and sirens of the vehicle 301.

In some embodiments, the sweeping radar device 101 may receive (such as through the receiving device 130) electromagnetic waves 110 that extend outwardly from the transmitting device 120 in a 180° arc from the horizontal plane of the rear bumper of the vehicle 301. In other embodiments, such as the locations depicted in FIGS. 2A and 2C, the arc may be measured from the horizontal plane of the front bumper of the vehicle 301, or from the horizontal plane of the rear-most point of the vehicle 301, or from the horizontal plane of the front-most point of the vehicle 301. In other embodiments, the sweeping radar device 101 may receive (such as through the receiving device 130) electromagnetic waves 110 that extend outwardly from the transmitting device 120 in a 90° arc, a 120° arc, a 270° arc, or an arc from 90° to 120°, or from 90° to 180°, or from 90° to 270°, or from 180° to 120°, or from 180° to 270°. The sweeping radar device 101 may receive electromagnetic waves 110 that extend outwardly from the transmitting device 120 by at least 1000 feet as measured from the horizontal plane of the of the rear bumper of the vehicle 301, the horizontal plane of the front bumper of the vehicle 301, the horizontal plane of the rear-most point of the vehicle 301, or from the horizontal plane of the front-most point of the vehicle 301. In other embodiments, the sweeping radar device 101 may receive electromagnetic waves 110 that extend outwardly from the transmitting device 120 by at least 900 feet, or at least 600 feet, or at least 500 feet, or at least 300 feet, or at least 100 feet.

In some embodiments, the danger range 650, the intermediary semi-dangerous range, or both the combined danger range 650 and intermediary semi-dangerous range, may extend from the transmitting device 120 of the sweeping radar device 101 in a 90° arc, a 120° arc, a 270° arc, or an arc from 90° to 120°, or from 90° to 180°, or from 90° to 270°, or from 180° to 120°, or from 180° to 270° Likewise, the danger range 650, the intermediary semi-dangerous range, or both the combined danger range 650 and intermediary semi-dangerous range, may extend from the transmitting device 120 of the sweeping radar device 101 by at least 1000 feet, or at least 900 feet, or at least 600 feet, or at least 500 feet, or at least 300 feet, or at least 100 feet. In some embodiments, the danger range 650, the intermediary semi-dangerous range, or both the combined danger range 650 and intermediary semi-dangerous range, may extend from the transmitting device 120 of the sweeping radar device 101 by from 0 to 1000 feet, or 0 to 900 feet, or 0 to 600 feet, or from 0 to 500 feet, or from 0 to 300 feet, or from 0 to 100 feet. It should be understood that any of these ranges may be combined, for example, a 90° to 120°, or from 90° to 180°, or from 90° to 270°, or from 180° to 120°, or from 180° to 270° arc that extends 1000 feet, or 900 feet, or 600 feet, or 500 feet, or 300 feet, or 100 feet.

In some embodiments, the transmitter, the receiver, or both, may utilize Lidar technology, Doppler technology, Sonar technology, Sodar technology, or combinations of these in transmitting the electromagnetic waves 110, receiving the electromagnetic waves 110, or both. Without being bound by any particular theory, Lidar refers to a surveying method that measures distance to a target by illuminating the target with a laser light. Similarly, Sonar technology refers to use of sound propagation by sending out sound waves and listening for echoes or other emitted pulses of sound. Sodar technology refers to using meteorological instruments, such as a wind profiler, to measure the scattering of sound waves by atmospheric turbulence using sound waves. Finally, Doppler technology refers to a specialized radar the utilizes the Doppler effect to produce velocity data regarding objects at a distance by bouncing microwave signals off of the desired target and analyzing how the object alters the frequency of the returned signal. Any combination of these or other known technologies may be used to determine characteristics about potentially hazardous objects in the path of the sweeping radar device 101. For instance, these technologies may be used to determine the distance the object is from the sweeping radar device 101, the velocity of the object, the trajectory path of the object, the likelihood of collision between the object and the vehicle 301, the size and nature of the object, and other such characteristics. All of these factors may be evaluated in determining the output criteria, which determines whether an affirmative or passive response should be triggered.

Figure 4:
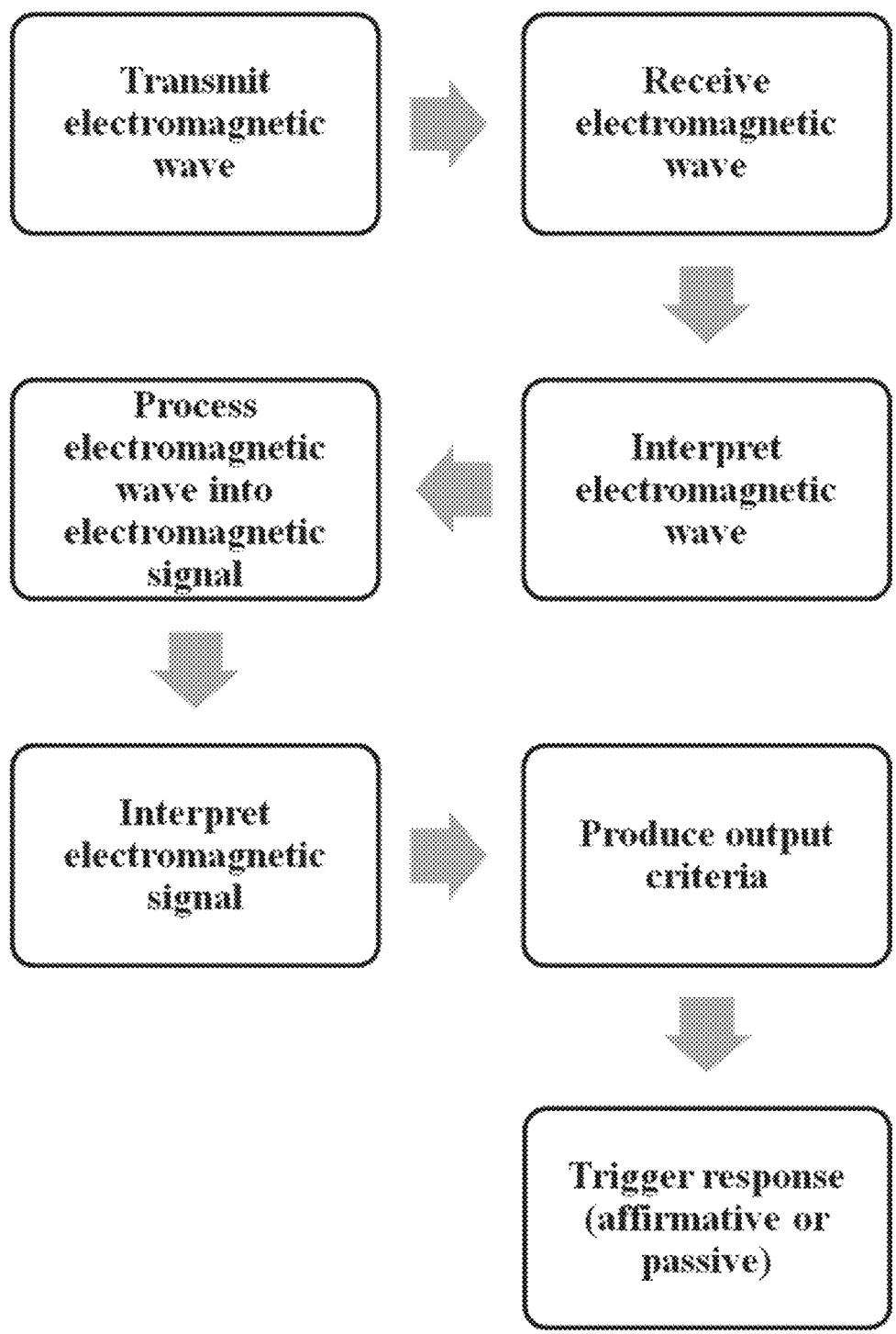
FIG. 4 is a block diagram of an example radar system according to embodiments shown and described herein.

FIG. 4 is a block diagram of a method for detecting objects in the vicinity of a vehicle 301 in accordance with the present embodiments. As shown in FIG. 4, embodiments of the present disclosure also relate to methods for detecting objects in which the method includes transmitting at least one electromagnetic wave 110 with a transmitting device 120, receiving the electromagnetic wave 110 with a receiving device 130, and converting the electromagnetic wave 110 to an electromagnetic signal. The electromagnetic wave 110 may be transmitted in a sweeping arc pattern. The electromagnetic signal is then processed by a processor 150 to generate at least one output criteria, which triggers at least one response by a vehicle 301 coupled to the processor 150. The response may be an affirmative response that activates a component in the vehicle 301, such as the lights, alarms, of a combination of internal or external lights and alarms. Alternatively, the response may be a passive response that does not active a component but triggers a "no response." The transmitting device 120, receiving device 130, electromagnetic waves 110, electromagnetic signals, processor 150, and vehicle 301, may be in accordance with any of the embodiments previously described. In some embodiments, the method may further include generating the at least one electromagnetic wave 110 with a signal generator, which may be coupled to the transmitter. The signal generator may be in accordance with any of the embodiments previously described.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modification and variations come within the scope of the appended claims and their equivalents.

Having described the subject matter of the present disclosure in detail and by reference to specific embodiments of any of these, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. A sweeping radar device for a vehicle comprising:
   a transmitting device that transmits at least one electromagnetic wave;
   a receiving device coupled to the transmitting device that receives the at least one electromagnetic wave and converts the at least one electromagnetic wave into at least one electromagnetic signal; and
   a processor coupled to the receiving device that interprets the at least one electromagnetic signal to produce at least one output criteria that triggers at least one response by the vehicle;
   wherein:
      the at least one electromagnetic wave is transmitted in a sweeping fashion, and
      the at least one response is a passive or an affirmative response based on the at least one output criteria, in which
         the affirmative response activates one or more components selected from the group consisting of an internal light in the vehicle, an external light on the vehicle, an internal alarm in the vehicle, an external alarm on the vehicle, or combinations thereof, and
         the passive response does not activate a component in the vehicle.

2. The sweeping radar device of claim 1, wherein the passive or affirmative response based on the at least one output criteria is triggered due to the proximity, speed, or trajectory of an object detected by the at least one electromagnetic wave.

3. The sweeping radar device of claim 1, wherein the sweeping pattern of the at least one electromagnetic signal extends in at least an 180° arc and extends outwardly from the vehicle by at least 300 feet.

4. The sweeping radar device of claim 1, wherein the sweeping radar device is mounted on the vehicle.

5. The sweeping radar device of claim 1, wherein the sweeping radar device freely movable.

6. The sweeping radar device of claim 1, wherein the transmitting device, the receiving device, or both, is an antenna.

7. The sweeping radar device of claim 6, further comprising a duplexer coupled to the antenna that alternates the functionality of the antenna from a transmitting device to a receiving device and from a receiving device to a transmitting device.

8. The sweeping radar device of claim 1, further comprising a signal generator that generates at least one electromagnetic wave wherein the signal generator is coupled to the transmitter.

9. The sweeping radar device of claim 1, wherein the at least one electromagnetic wave comprises at least one component selected from the group consisting of radio waves, ultraviolet waves, visible light waves, near infrared light waves, infrared light waves, or combinations thereof.

10. The sweeping radar device of claim 1, wherein the transmitter, the receiver, or both, utilize at least one of Lidar technology, Doppler technology, Sonar technology, Sodar technology, or combinations thereof.

11. The sweeping radar device of claim 1, wherein the processor determines at least one of a speed of an object and the distance of the object to the vehicle to formulate the output criteria, and interprets the output criteria to determine whether the affirmative response or the passive response should be generated, and, if the affirmative response is determined, assigns a severity level of the affirmative response based on the at least one of the speed of the object or the distance of the object to the vehicle.

12. The sweeping radar device of claim 11, wherein the severity level of the affirmative response determines at least one of: which of the one or more components in the vehicle are activated, an amount of the one or more components in the vehicle that are activated, an intensity of the one or more components that are activated, a duration of the one or more components that are activated, or combinations thereof.

13. A method for detecting objects in the vicinity of a vehicle, the method comprising:
   transmitting at least one electromagnetic wave with a transmitting device,
   receiving the at least one electromagnetic wave with a receiving device,
   converting the at least one electromagnetic wave into at least one electromagnetic signal,
   processing the at least one electromagnetic signal in a processor to generate at least one output criteria,
   generating at least one output criteria that is received by a processor, wherein the processor interprets the at least one output criteria and is coupled to the vehicle, and
   triggering at least one response by the vehicle,
   wherein:
      the at least one electromagnetic wave is transmitted in a sweeping fashion, and
      the at least one response is a passive or an affirmative response based on the at least one output criteria, in which
      the affirmative response activates one or more components selected from the group consisting of an internal light in the vehicle, an external light on the vehicle, an internal alarm in the vehicle, an external alarm on the vehicle, or combinations thereof, and
      the passive response does not activate a component in the vehicle.

14. The method of claim 13, wherein the sweeping pattern of the at least one electromagnetic signal extends in at least an 180° arc and extends outwardly from the vehicle by at least 300 feet.

15. The method of claim 13, wherein the transmitting device, the receiving device, or both, is an antenna, and wherein the antenna is coupled to a duplexer that alternates the functionality of the antenna from a transmitting device to a receiving device and from a receiving device to a transmitting device.

16. The method of claim 13, further comprising generating the at least one electromagnetic wave with a signal generator, wherein the signal generator is coupled to the transmitter.

17. The method of claim 13, wherein the at least one electromagnetic wave comprises at least one component selected from the group consisting of radio waves, ultraviolet waves, visible light waves, near infrared light waves, infrared light waves, and combinations thereof.

18. The method of claim 13, wherein the at least one of transmitting the at least one electromagnetic wave with a transmitting device, receiving the at least one electromagnetic wave with a receiving device, or both utilizes Lidar technology, Doppler technology, Sonar technology, Sodar technology, or combinations thereof.

19. The method of claim 13, wherein the processor determines at least one of a speed of an object and the distance of the object to the vehicle to formulate the output criteria, and interprets the output criteria to determine whether the affirmative response or the passive response should be generated, and, if the affirmative response is determined, assigns a severity level of the affirmative response based on the at least one of the speed of the object or the distance of the object to the vehicle.

20. The method of claim 19, wherein the severity level of the affirmative response determines at least one of: which of the one or more components in the vehicle are activated, an amount of the one or more components in the vehicle that are activated, an intensity of the one or more components that are activated, a duration of the one or more components that are activated, or combinations thereof.

* * * * *